(12) United States Patent
Passerell et al.

(10) Patent No.: US 6,371,525 B1
(45) Date of Patent: Apr. 16, 2002

(54) GAS RISER WITH FREE ROTATING PLASTIC RISER CASING

(75) Inventors: Steven J. Passerell, Rock Creek; Dave Robison, Madison, both of OH (US)

(73) Assignee: Perfection Corporation, Madison, OH (US)

( * ) Notice: Subject to any disclaimer, the term of this patent is extended or adjusted under 35 U.S.C. 154(b) by 0 days.

(21) Appl. No.: 09/402,012

(22) PCT Filed: Apr. 1, 1998

(86) PCT No.: PCT/US98/06438

§ 371 Date: Sep. 28, 1999

§ 102(e) Date: Sep. 28, 1999

(87) PCT Pub. No.: WO98/44285

PCT Pub. Date: Oct. 8, 1998

Related U.S. Application Data
(60) Provisional application No. 60/042,301, filed on Apr. 1, 1997.

(51) Int. Cl.[7] ................................................. F16L 27/00
(52) U.S. Cl. ................ 285/123.15; 285/341; 29/890.14
(58) Field of Search ................................ 285/305, 321, 285/123.1, 123.15, 123.16, 123.17, 341, 339, 342; 29/890.14, 890.141, 282

(56) References Cited

U.S. PATENT DOCUMENTS

| | | | |
|---|---|---|---|
| 1,539,327 A | | 5/1925 | Phillips et al. |
| 2,040,834 A | * | 5/1936 | Cowles .................... 285/259 X |
| 3,498,647 A | * | 3/1970 | Schroder ................ 285/123.15 |
| 3,815,940 A | * | 6/1974 | Luckenbill .................. 285/105 |
| 3,986,732 A | * | 10/1976 | Stanley .................... 285/121.3 |
| 4,085,950 A | * | 4/1978 | Alewitz ............. 285/123.15 X |
| 4,119,335 A | | 10/1978 | Rieffle et al. |
| 4,132,083 A | * | 1/1979 | McGrath .................... 29/282 X |
| 4,229,025 A | * | 10/1980 | Volgstadt et al. ........ 285/323 X |
| 4,282,175 A | * | 8/1981 | Volgstadt et al. .... 29/890.14 X |
| 4,521,037 A | | 6/1985 | Knox |
| 4,754,782 A | * | 7/1988 | Grantham .................... 138/109 |
| 4,871,196 A | * | 10/1989 | Kingsford ............ 285/123.1 X |
| 4,890,865 A | * | 1/1990 | Hosono et al. ..... 285/123.15 X |
| 4,999,900 A | * | 3/1991 | Anderson ............. 29/890.14 X |
| 5,149,148 A | * | 9/1992 | Taeuber, Jr. et al. ........ 285/276 |
| 5,398,977 A | * | 3/1995 | Berger et al. ....... 285/123.15 X |
| 5,433,485 A | * | 7/1995 | Austin, Jr. et al. .. 285/123.15 X |
| 5,628,532 A | * | 5/1997 | Ashcraft ............ 285/123.15 X |
| 5,692,785 A | * | 12/1997 | Wartluft et al. ............. 285/328 |
| 5,934,712 A | * | 8/1999 | Friedrich et al. ....... 285/123.15 |

FOREIGN PATENT DOCUMENTS

FR  1059547  7/1952

* cited by examiner

Primary Examiner—Lynne H. Browne
Assistant Examiner—David E. Bochna
(74) Attorney, Agent, or Firm—Fay, Sharpe, Fagan, Minnich & McKee, LLP (57) ABSTRACT

A riser assembly to transmit gas from a buried fluid line to a manifold. Inner (50) and outer (90) casings are received in a first end of an adapter (54). The other end of the adapter (60) is secured to the manifold. A gripping assembly (70) holds the inner casing in the adapter and prevents a pullout while also providing a sealed inner face between the inner casing and the adapter. A mounting assembly is provided to secure the outer casing in the adapter. It, too, prevents pullout of the outer casing and also allows the outer casing to freely rotate relative to the adapter. In selected embodiments the outer casing is formed of a non-corrosive material such as a PVC or polyethelene to address corrosion resistant properties.

32 Claims, 6 Drawing Sheets

GAS RISER WITH FREE ROTATING PLASTIC RISER CASING

This appln is a 371 of PCT/US98/06438 filed Apr. 1, 1998 and claims benefit of Prov. No. 60/042,301 filed Apr. 1, 1997.

BACKGROUND OF THE INVENTION

This application is directed to transmission assemblies, and more particularly to gas risers used in transmitting natural gas from a buried underground gas line to a home or business.

U.S. Pat. No. 5,590,914 is commonly owned by the assignee of the present application and the details of that patent are incorporated herein by reference. It generally illustrates a gas riser assembly of the type to which the subject invention pertains where natural gas is supplied from a main, through a buried service line, and eventually to the riser assembly. The riser assembly extends from an underground connection with the service line, through an elbow region, to a vertically disposed pipe that communicates with a manifold of an above-ground gas meter.

The gas riser assembly is either factory-assembled or intended for assembly in the field. In either case, the gas riser assembly includes a double-walled conduit comprising an inner, plastic tube or casing received inside a rigid, outer casing. The inner casing defines the fluid passage for the gas as it is transported from the main to the meter. Spacers may be provided at selected axial locations along the length of the assembly, if desired. The riser assembly is connected to the manifold in a fluid tight manner so that a sealed passageway is provided from the underground connection to the manifold.

Strength of the riser is an important consideration. It must be strong enough to support the weight load of the residential piping system, while maintaining a sealed relationship with the manifold.

It is also desirable to use corrosion-free materials in riser assembly since the outer casing, which is typically made of steel, is otherwise subject to corrosive attack. For this reason, the outer casing is usually treated, i.e., coated. The coating operation adds to the overall cost of the assembly.

In prior arrangements, the end of the riser that connects with the manifold is a rigid structure. When the riser assembly is connected to the manifold, joint stress can build up in the assembly. Moreover, disassembly required the loss of a gas seal of the tensile grip on the internal tube of the riser assembly. Additionally, the designs were either intended for factory assembly or field assembly, as opposed to being modular in design to allow flexibility.

Corrosion resistance is also a concern. It is also preferred that the assembly be electrically isolated from ground contact, and strong enough to support the weight load of the residential piping assembly. Known assemblies, though, often require some type of corrosion protection or an auxiliary support device, i.e., a bracket assembly, to achieve these objectives.

Thus, there is a desire for a new and improved riser assembly that achieves these various objectives and results in an extended service life.

SUMMARY OF THE INVENTION

The present invention provides a riser assembly that overcomes the noted drawbacks in a simple, economical manner.

According to the invention, there is provided a riser assembly having an adapter that connects to a manifold at one end, and has an opening at an opposite end adapted to receive the double walled conduits or casings therein. An inner casing is held in the adapter by a gripping assembly. An outer casing concentrically surrounds the inner casing and is held in the adapter by a mounting assembly. The mounting assembly prevents pullout of the outer casing from the adapter and allows the outer casing to freely rotate relative to the adapter.

According to another aspect of the invention, the outer casing is a plastic material that provides corrosion resistant and dielectric properties.

According to still another aspect of the invention, the outer casing is defined by a metal tube coated in plastic.

According to yet another aspect of the invention, the mounting assembly includes a toothed collet.

A principal benefit of the present invention is the ability to rotate the outer casing relative to the adapter for ease of assembly and disassembly.

Yet another benefit of the present invention resides in the modular design that allows factory or in-field assembly of the gas riser.

Yet another advantage of the invention is found in the corrosion resistant, electrically isolated assembly that is able to meet the demands of piping systems.

Still other advantages and benefits of the present invention will become more apparent to one skilled in the art upon a reading and understanding of the following specification.

BRIEF DESCRIPTION OF THE DRAWINGS

The invention may take physical form in certain parts and arrangements of parts, preferred embodiments of which will be described in detail in this specification. The embodiments are illustrated in the accompanying drawings which form a part of this disclosure.

DETAILED DESCRIPTION OF THE PREFERRED EMBODIMENTS

Referring now to the drawings wherein the showings are for the purposes of illustrating the preferred embodiments of the invention only and not for purposes of limiting same, the FIGURES show a main gas supply line A that communicates with a manifold B associated with a residential or commercial establishment via a buried line C and a gas riser assembly D. More particularly, and with reference to FIG. 1, natural gas is supplied from the main A to a first end of the buried service line C. The opposite end of the service line is inserted into a conventional coupling, such as a stab-type coupling 20 which receives a first end 22 of an inner plastic conduit, tube or casing 24. The first end of the internal tube extends outwardly from a second or outer conduit, tube, or casing 30. Typically, the outer casing and the inner casing are bent in the form of an elbow at a lower end thereof and the inner and outer casings are maintained in spaced relation by means of annular spacers 32, 34. An upper end 36 of the outer casing is adapted for connection to the manifold B. For example, external threads 38 are provided on the upper end of the outer casing for connection to the manifold. Thus, gas is transported from the main, through the service line, and through the inner casing to the manifold where it is metered before entry into the residential or commercial establishment.

Figure 1:
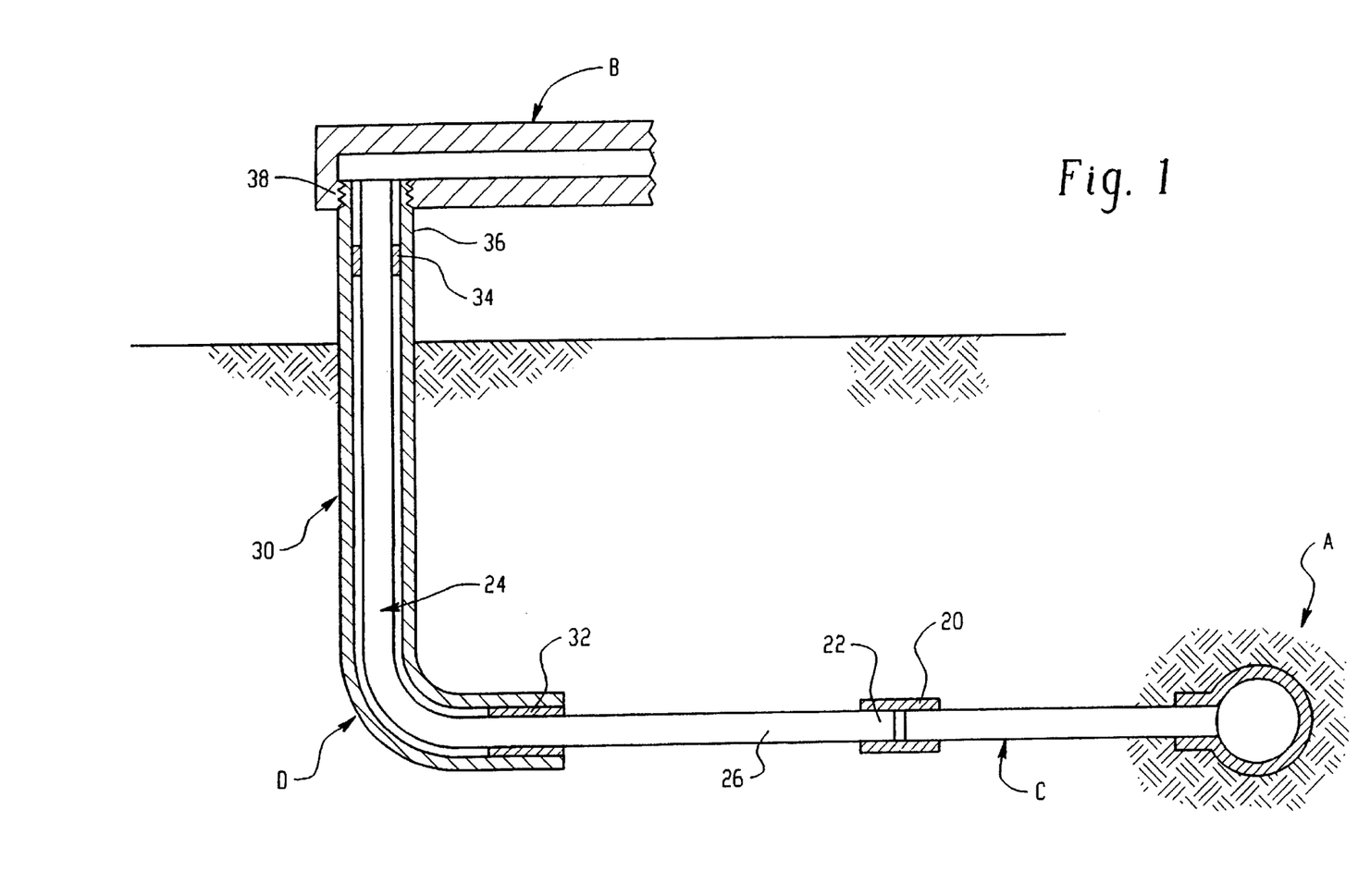
FIG. 1 is a schematic representation of a natural gas distribution system from main to meter.

The riser assembly is buried in the ground and the outer rigid casing provides suitable protection for the inner casing. Because of the contract with the ground surface, corrosion protection is often provided on the outer casing. For example, the outer casing is often a steel structure that is galvanized with a hot dip zinc or coated with a plastic or epoxy material.

Even though prior art assemblies have met with substantial commercial success, it is desirable to use corrosion-free materials to eliminate additional manufacturing steps associated with the coating of the metal casing. On the other hand, strength of the riser is also an important factor. The riser must be capable of supporting the weight load of the residential piping system and still maintain a sealed relationship with the manifold.

Figure 2:
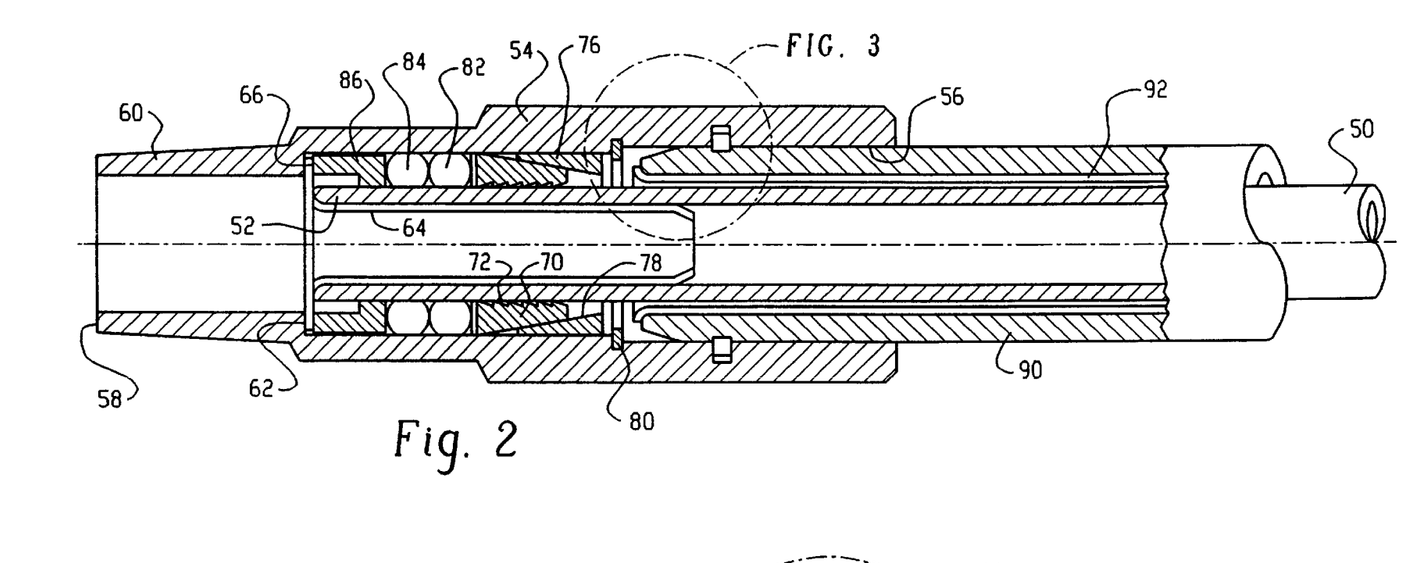
FIG. 2 is a longitudinal cross-sectional view of a first preferred embodiment of the new gas riser assembly.

Turning to FIG. 2, the first or upper end of a first preferred embodiment of the riser assembly is illustrated in greater detail. It includes an inner casing or plastic tube 50 through which natural gas is transmitted from the main to the manifold. A first end 52 of the inner casing is received in an adapter 54, also known as a service head adapter. As shown, the service head adapter is a generally hollow cylindrical configuration having an opening 56 at a first end that receives the inner tube therein. A second end 58 of the adapter is preferably externally threaded at 60 for mounting the riser assembly to the manifold.

A radial shoulder 62 is defined by a first counterbore. The counterbore defines the maximum extent of insertion of the inner tube into the adapter. More particularly, a hollow stiffener 64 received in the end of the inner tube has a radial shoulder 66 that engages the shoulder 62 of the adapter and limits insertion of the stiffener.

A gripping assembly is received in the adapter about the inner end of the inner casing 50. A preferred gripping assembly includes a collet member 70 having an internal toothed profile 72 and an outer tapered surface 74. A tapered surface cooperates with a wedge member 76 that has a complementary internal tapered surface 78. Thus, any pullout force imposed on the inner casing 50 is resisted by the cooperating action between the collet and the wedge member which tightly grips the external surface of the inner casing. As will be appreciated, the wedge abuttingly engages a shoulder defined by retaining ring 80.

Inwardly disposed from the collet is a seal assembly defined by a pair of seal members 82, 84. Each seal member is a resilient O-ring that provides a sealed relationship between the external surface of the inner casing and the inner surface of the adapter, particularly along the first counterbore region. Moreover, a ring 86 disposed inwardly of the O-rings serves as both a spacer and also acts to grip the external surface of the inner casing.

Figure 3:
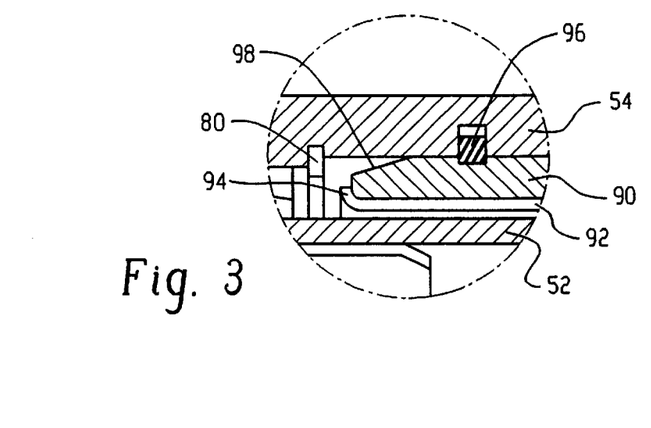
FIG. 3 is an enlarged view of the encircled area of FIG. 2.

With continued reference to FIG. 2, and additional reference to FIG. 3, details of the outer casing and its receipt in the adapter are shown therein. Particularly, proceeding axially outward from the retaining ring 80 is a first end of the outer casing 90. In this embodiment, the outer casing 90 is formed of a non-corrosive material such as a polymer, e.g., polyvinyl chloride (PVC) or a polyethylene. These materials are preferred because they provide both corrosion resistant and dielectric properties. In addition, a reinforcing member such as a thin-walled steel tubing 92 is received along the inner diameter of the outer casing. The reinforcing member preferably includes a radial shoulder 94 that abuts against the terminal end of the outer casing.

As illustrated in FIG. 3, the external surface of the outer casing includes a groove that cooperates with a radially extending groove in the adapter to receive a ring 96 that in combination define an outer casing mounting assembly. In this embodiment, the ring has a rectangular profile or cross-section that permits the outer casing to rotate relative to the adapter and prevents pullout of the outer casing. To facilitate make-up of the assembly, a taper region 98 is provided on the inner end of the outer casing. The taper allows the outer casing to be inserted into the adapter opening and past the ring 96. It cannot, however, be inserted beyond the retaining ring 80 that holds the gripping assembly for the inner casing in place.

Figures 4, 5:
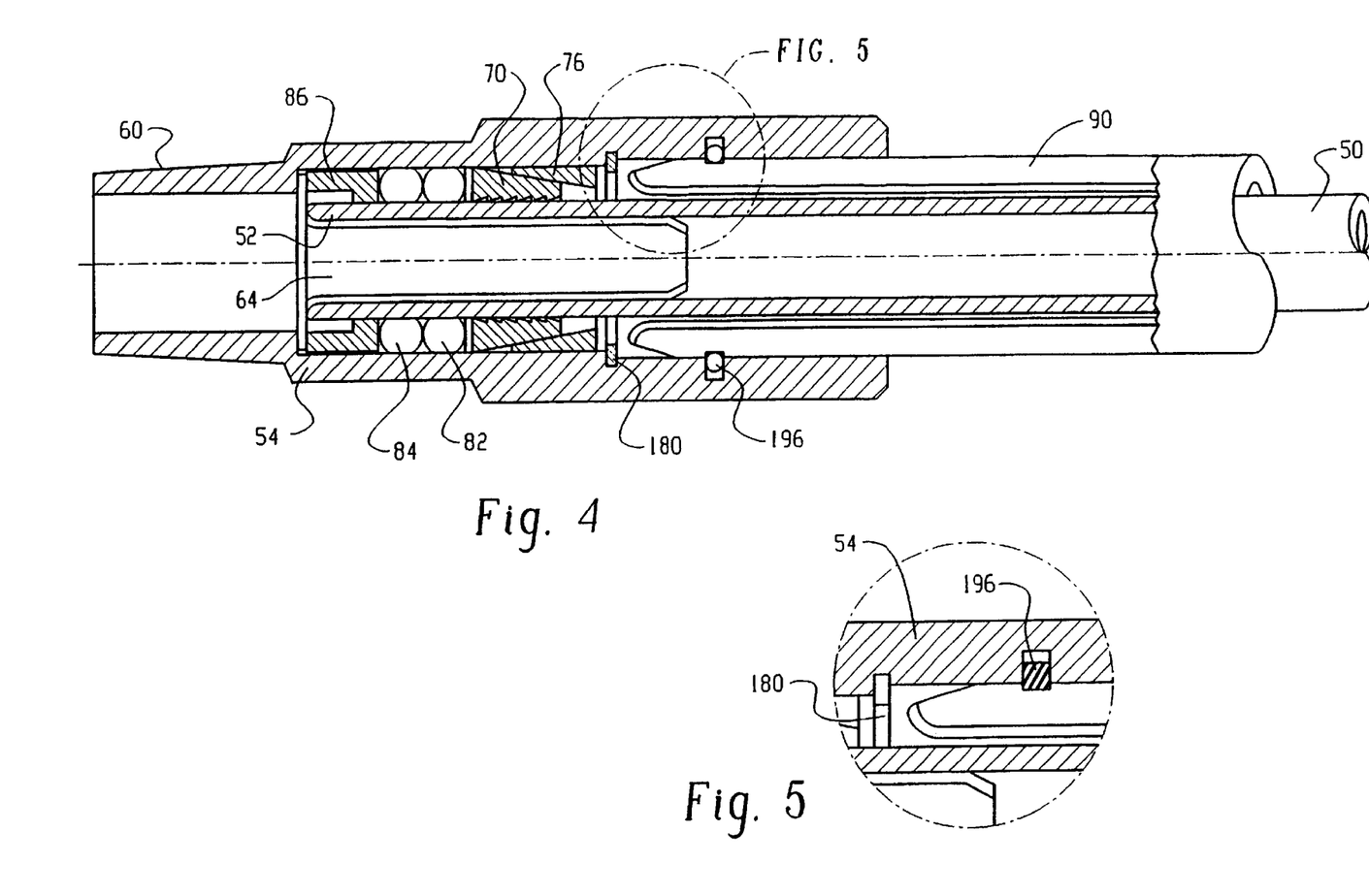
FIG. 4 is a longitudinal cross-sectional view of a second preferred embodiment of the new gas riser assembly.
FIG. 5 is an enlarged view of the encircled area of FIG. 4.

A second preferred embodiment of the invention is shown in FIGS. 4 and 5 and has many similarities to the embodiment of FIGS. 2 and 3. Particularly, a primary area of distinction resides in the mounting assembly for the outer casing. Here, the retaining ring 196 has a generally circular cross-sectional conformation. Moreover, in this factory-assembled assembly, the retaining ring 80 used in the embodiment of FIGS. 2 and 3 is eliminated and replaced by a radial shoulder 180 that extends inwardly from the adapter. Thus as will be appreciated, the individual components of the gripping assembly that retains the inner casing in the adapter can be assembled in the factory, along with the outer casing and mounting assembly. In this manner, the entire assembled riser is shipped for use in the field and the only required connections are the inner tube to the buried service line and the adapter to the manifold. In substantially all other respects, the embodiment of FIGS. 4 and 5 is similar to that described in association with FIGS. 2 and 3.

Figure 6:
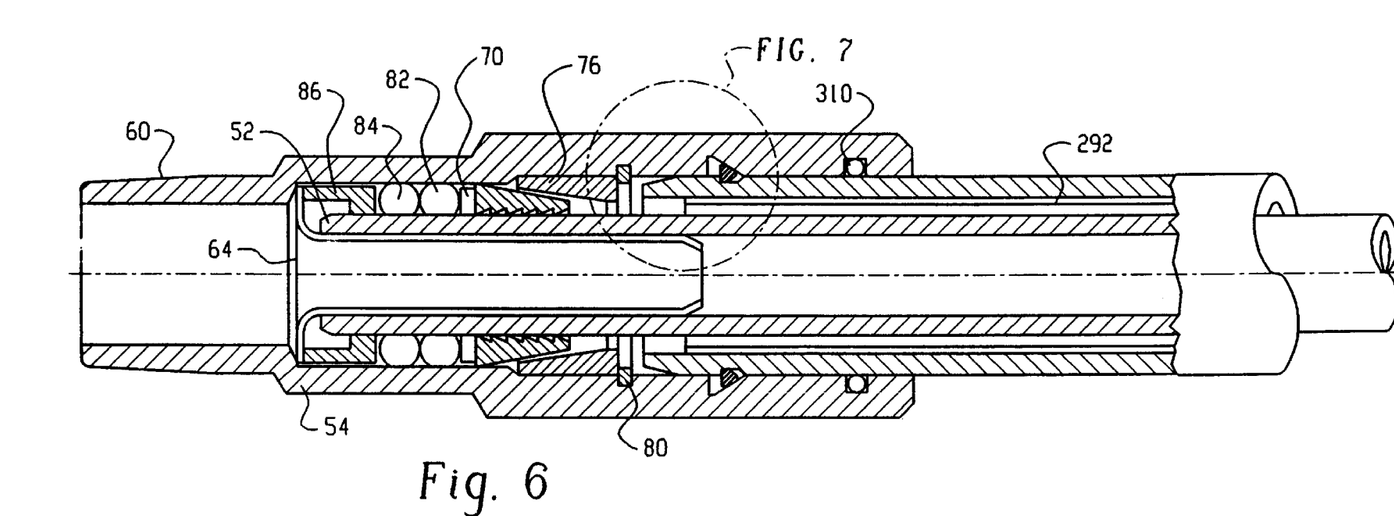
FIG. 6 is a longitudinal cross-sectional view of a third preferred embodiment of the present invention.
Figure 7:
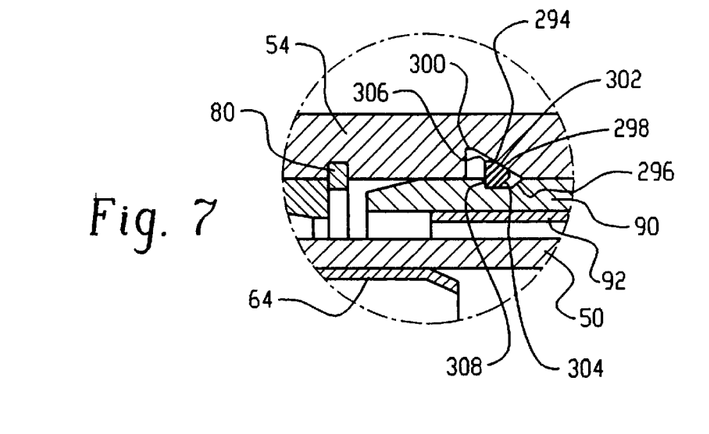
FIG. 7 is an enlarged detailed view of the encircled area of FIG. 6.

A third preferred embodiment is illustrated in FIGS. 6 and 7. Where possible, like reference numerals again refer to like elements and new components are identified by new numerals. For example, the inner casing and the gripping assembly associated therewith are substantially unchanged in the third preferred embodiment from that shown and described with reference to FIGS. 2 and 3. However, in this arrangement a reinforcing member 292 in the outer casing 90 does not have a radial flange at the inner terminal end.

As may be appreciated, where the outer casing is formed from a hard material such as PVC over steel, it was found that additional tapers were required to allow the outer casing to be inserted into the adapter. Thus, the grooves 294, 296 in the inner diameter of the adapter and the external surface of the outer casing, respectively, are modified along with the conformation of the mounting ring to more effectively prevent pullout of the outer casing from the adapter. Particularly, the adapter groove 294 has a tapered conformation 298 along one end then merges into a substantially right-angled or radial shoulder 300 at the other end. Similarly, the mounting ring has first and second tapered portions 302, 304, one of which conforms to the tapered surface in the adapter groove, and the second of which conforms to the tapered region in the external groove of the outer casing. Preferably, these tapers face outwardly from the adapter while the opposite end of the mounting ring has substantially right-angled shoulders 306, 308 that limit further insertion of the outer casing into the adapter. The cooperating tapered surfaces assure that additional pullout forces on the outer casing exert a radially inward directed clamping force on the outer casing.

In addition, a moisture seal 310 may be provided adjacent the opening in the adapter to prevent moisture from entering between the external surface of the outer casing and the opening in the adapter.

Figure 8:
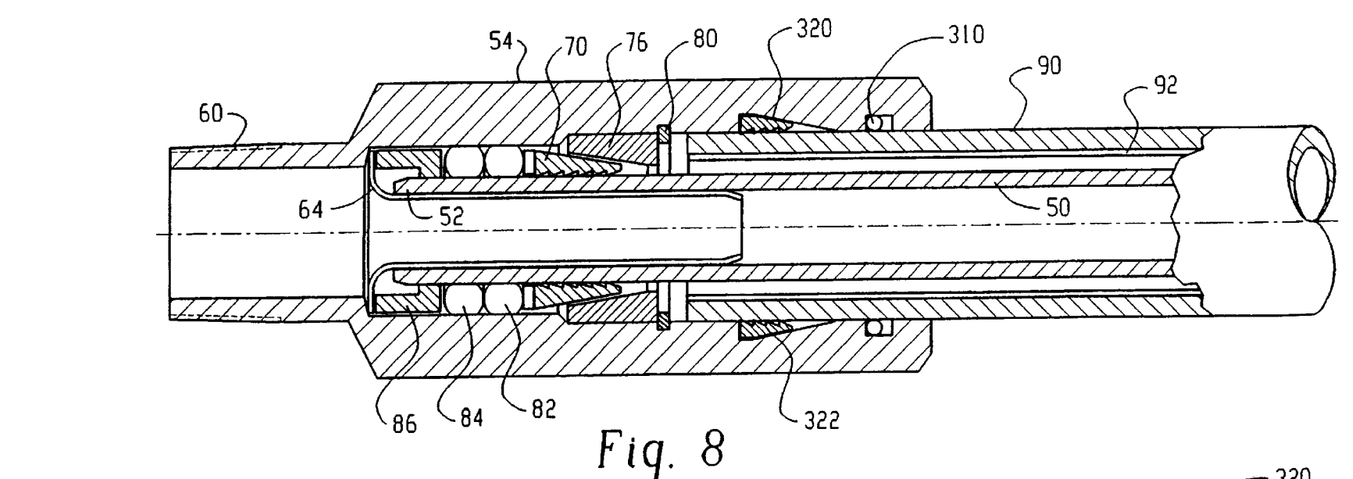
FIG. 8 is a longitudinal cross-sectional view of a fourth preferred embodiment of the present invention.
Figure 9:
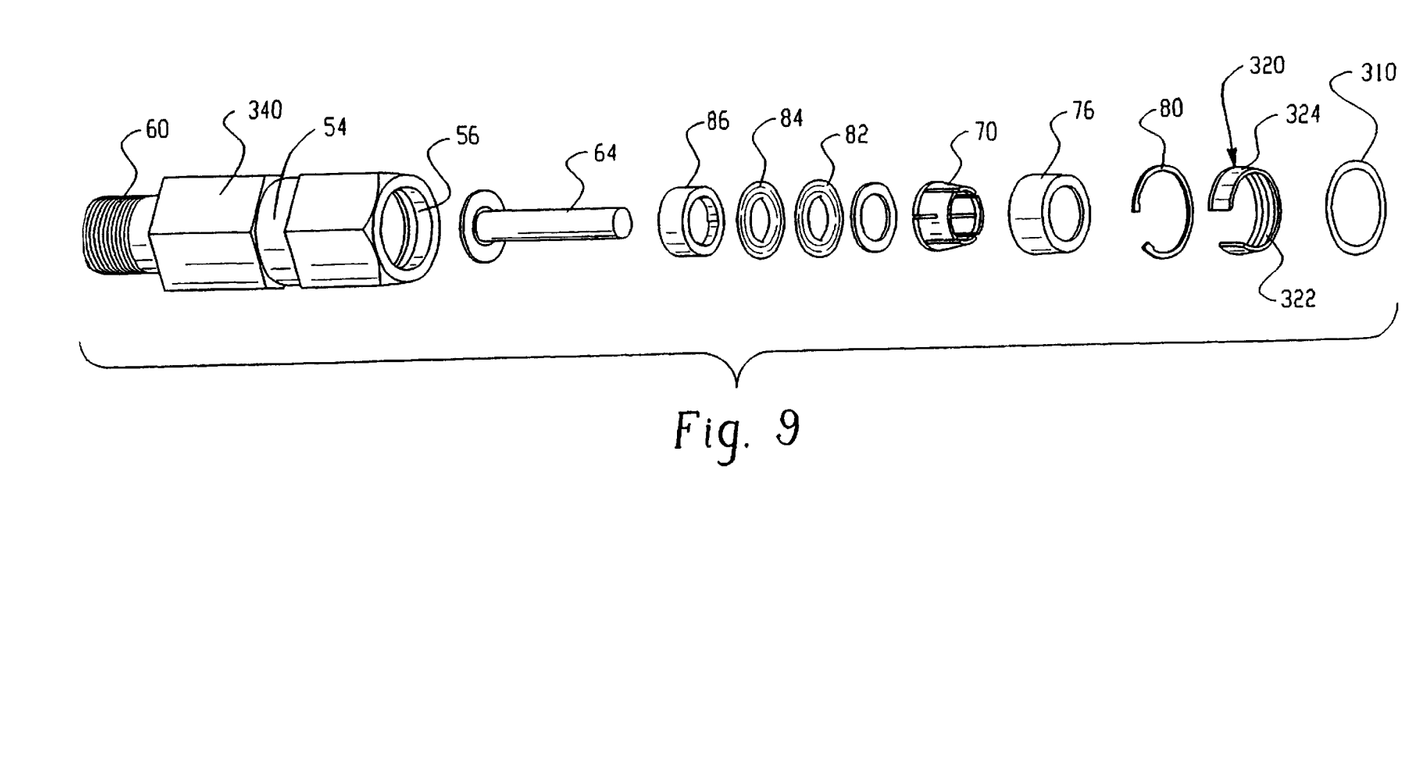
FIG. 9 is an exploded perspective view of selected components of the gas riser assembly of FIG. 8.
Figure 10:
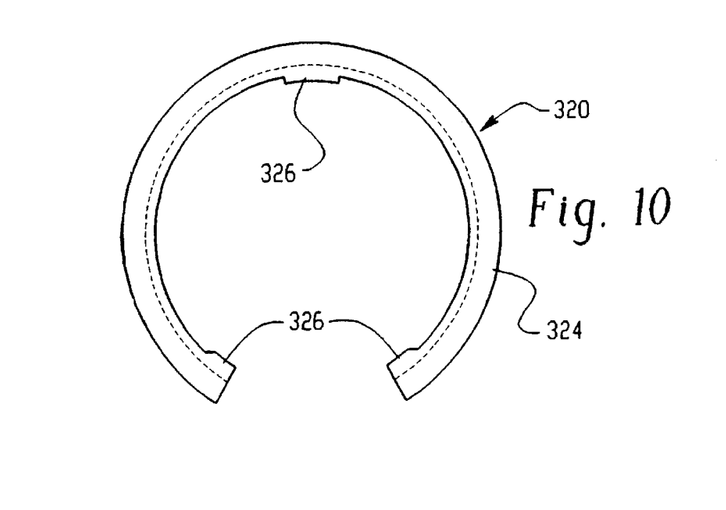
FIG. 10 is an elevational view of the collet used in FIGS. 8 and 9.

FIGS. 8–10 illustrates yet another preferred embodiment of a mounting assembly for the outer casing. In this arrangement, the plastic material of the outer casing is a slightly softer material such as polyethylene. To enhance the resistance to pullout forces, a collet ring 320 is used. It includes a toothed interior surface defined by generally circumferentially continuous, axially spaced teeth 322. Additionally, an outer surface 324 of the collet member is tapered to cooperate with an elongated tapered region in the groove of the adapter. Thus as pullout forces are exerted on the outer casing, greater radial gripping is transferred by the tapering surfaces that urge the teeth into the external surface of the outer casing. Moreover, the collet is preferably a split arrangement allowing it to be easily slid over the outer diameter of the outer casing.

Figure 11:
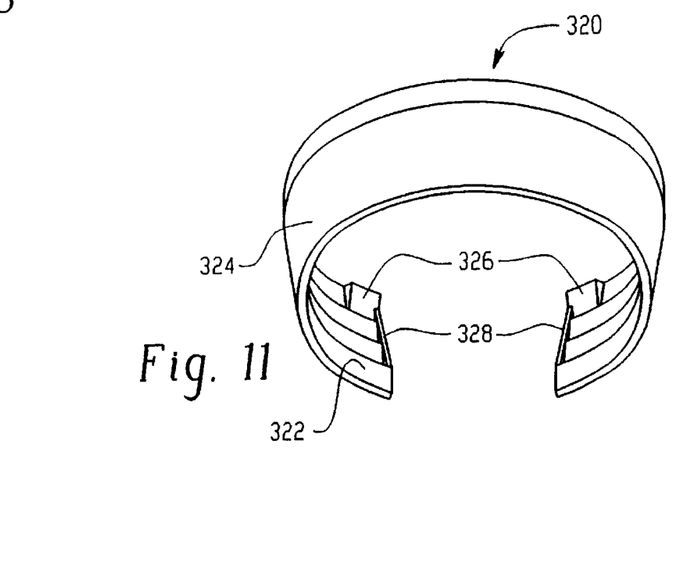
FIG. 11 is a perspective view of the collet of FIG. 10.

As best illustrated in FIG. 10, one or more barbs 326 extend radially inward from the inner diameter of the collet. These barbs are dimensioned to bite or engage into the external surface of the outer casing. Since there is no requirement that the outer casing be sealed relative to the adapter, it is permissible for the barbs to tightly grip or even scratch the external surface of the outer casing. In fact, it is desirable that the barbs, along with the axial ribs 328 (FIG. 11) assure that the collet member and the outer casing rotate together. That is, if the outer casing is rotated relative to the adapter, the collet member will rotate with the outer casing. In this manner, the outer casing cannot be "unscrewed" relative to the collet because of the presence of the barbs and the axial ribs. Commonly owned international application Serial No. PCT/US98/00630 describes the features and benefits of such an arrangement.

As is apparent from the various embodiments, the outer casing can rotate relative to the adapter. This allows the riser to be easily assembled and disassembled in the field from the manifold. Moreover, use of a non-corrosive outer casing addresses concerns with corrosion protection while the insert or reinforcing member still provides additional strength to the outer casing, preferably along the entire length of the riser, or at least to a region below grade.

Tool flats 340 can be machined into the adapter or a standard hex-head arrangement can be used to facilitate rotation of the adapter. It is also contemplated that the adapter be coated with an epoxy or other non-corrosive material and the coating would extend over the lower most threads 60 to assure that there is no exposed metal.

The present invention is less susceptible to chemical or ultraviolet attack than known arrangements. Moreover, no special tools are required for assembly of the riser in the field. The light weight assembly also reduces installer fatigue.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A riser assembly adapted to transmit gas from an associated buried fluid line to an associated manifold, the riser assembly comprising:

a unitary adapter including a mounting structure at one end for connection to a manifold and having an opening at an opposite end;

an inner casing having a first end received through the opening in the adapter and held therein without threaded connections on the adapter;

a seal member interposed between the inner casing and the adapter for sealing therebetween;

a gripping assembly for holding the inner casing in the adapter;

an outer casing surrounding the inner casing and having a first end received through the opening in the adapter wherein the outer casing is a plastic material that provides corrosion resistant and dielectric properties; and a mounting assembly that prevents pullout of the outer casing from the adapter and allows the inner and outer casings to freely rotate relative to the adapter.

2. The riser assembly of claim 1 wherein the mounting assembly includes a ring interposed between the adapter and the outer casing.

3. The riser assembly of claim 2 wherein the mounting assembly includes first and second grooves in the adapter and the outer casing, respectively, that receive the ring.

4. The riser assembly of claim 1 further comprising a stiffener received in the first end of the inner casing.

5. The riser assembly of claim 4 wherein the inner casing extends outwardly from the first end of the outer casing and a stiffener is received in the inner casing a dimension sufficient to extend at least partially into the outer casing.

6. The riser assembly of claim 1 wherein the adapter includes a throughbore and first and second counterbores extending inwardly from the opening, the inner casing being received in the first counterbore and the outer casing being received in the second counterbore.

7. The riser assembly of claim 6 further comprising a retainer ring disposed at a juncture of the first and second counterbores, the retainer ring cooperating with the gripping assembly for limiting removal of the inner casing from the adapter.

8. The riser assembly of claim 1 wherein the gripping assembly includes an internally toothed collet having a tapered external surface that cooperates with a wedge member for gripping the inner casing upon imposition of an axial pullout force.

9. The riser assembly of claim 1 wherein the adapter includes tool flats thereon for engagement by an associated tool to facilitate connection to an associated manifold.

10. The riser assembly of claim 1 wherein the adapter mounting structure includes external threads provided on the adapter.

11. The riser assembly of claim 1 wherein the outer casing mounting assembly includes a ring having a tapered first shoulder that facilitates insertion of the outer casing through the ring.

12. The riser assembly of claim 11 wherein the ring includes a tapered second shoulder that cooperates with the adapter to prevent pullout of the outer casing from the adapter.

13. The riser assembly of claim 12 wherein the adapter includes a tapered groove that receives the ring and cooperates with the second shoulder.

14. The riser assembly of claim 11 wherein the split ring includes a substantially right-angle shoulder that cooperates with a radial shoulder on the outer casing to prevent pullout of the outer casing from the adapter.

15. The riser assembly of claim 1 wherein the outer casing mounting assembly includes a ring having a toothed inner surface for gripping the outer casing.

16. The riser assembly of claim 15 wherein the toothed inner surface includes axially spaced, circumferentially extending teeth.

17. The riser assembly of claim 16 wherein the toothed inner surface includes at least one axially extending rib that limits relative rotation between the ring and the outer casing.

18. The riser assembly of claim 16 wherein the ring further includes a radially inward extending barb for gripping the external surface of the outer casing.

19. The riser assembly of claim 1 wherein the outer casing includes a metal tube having a non-corrosive layer on an external surface thereof.

20. The riser assembly of claim 19 wherein the non-corrosive layer is extruded on the metal tube.

21. The riser assembly of claim 20 further comprising first and second counterbores extending inwardly from the second end of the adapter, the inner casing being received in the first counterbore and the outer casing being received in the second counterbore.

22. The riser assembly of claim 21 further comprising a retainer ring disposed at a juncture of the first and second counterbores, and a gripping assembly cooperating with the retainer ring for limiting removal of the inner casing from the adapter.

23. A riser assembly adapted to transmit gas from an associated buried fluid line to an associated manifold, the riser assembly comprising:

an adapter including a mounting structure at one end for connection to a manifold and having an opening at an opposite end;

an inner casing having a first end received through the opening in the adapter;

a seal member interposed between the inner casing and the adapter for sealing therebetween;

a gripping assembly for holding the inner casing in the adapter;

an outer casing surrounding the inner casing and having a first end received through the opening in the adapter;

a reinforcing member received in the first end of the outer casing and extending into the outer casing a dimension that extends beyond the adapter; and a mounting assembly that prevents pullout of the outer casing from the adapter and allows the inner and outer casings to freely rotate relative to the adapter.

24. A riser assembly that transmits gas from a buried line to a meter manifold, the riser assembly comprising:

an annular metal adapter having a throughbore extending from a first end to a second end of the adapter;

an inner plastic casing having a first end selectively received in the adapter upon connection to an associated meter manifold and a second end that extends outwardly therefrom for connection with an associated buried line;

an outer plastic casing received over the inner casing having a first end received in the adapter and a second end that extends outwardly therefrom to cover only a portion of the inner casing that is above ground; and a reinforcing member received between the inner and outer casings and extending for at least the entire length of the outer casing above ground.

25. The riser assembly of claim 24 further comprising a mounting assembly that prevents pullout of the outer casing from the adapter and allows the outer casing to freely rotate relative to the adapter.

26. The riser assembly of claim 25 wherein the mounting assembly includes a ring interposed between the adapter and the outer casing.

27. The riser assembly of claim 26 wherein the mounting assembly includes first and second grooves in the adapter and the outer casing, respectively, that receive the ring.

28. A method of assembling a riser having an adapter with a throughbore and first and second counterbores extending inwardly from one end of the adapter, and an inner casing having first and second ends, and an outer casing having first and second ends, a gripping assembly for holding the inner casing in the adapter and a mounting assembly the prevents pullout of the outer casing form the adapter, the method comprising the steps of:

connecting an adapter to an associated meter manifold;

inserting the first end of the inner casing into the first counterbore of the adapter;

inserting the gripping assembly into the adapter;

after the inner casing and gripping assembly inserting steps, inserting a retainer member in the adapter around the inner casing;

next inserting the outer casing into the adapter around the retainer member and the inner casing; and inserting a mounting assembly into the adapter.

29. The method of claim 28 comprising the further step of inserting a stiffener into the first end of the inner casing before the inner casing inserting step.

30. The method of claim 28 comprising the further step of inserting a reinforcing member into the first end of the outer casing before the outer casing inserting step.

31. The method of claim 28 further comprising the step of installing the gripping assembly on the inner casing before the inner casing inserting step.

32. A riser assembly adapted to transmit gas from an associated buried fluid line to an associated manifold, the riser assembly comprising:

an adapter including a mounting structure at one end for connection to an associated manifold and having a stab-type connector at an opposite end;

an inner casing having a first end irreversibly received in the stab-type connector;

a seal member interposed between the inner casing and the adapter for sealing therebetween;

a gripping assembly for holding the inner casing in the adapter;

an outer casing surrounding the inner casing and having a first end received through the opening in the adapter; and a mounting assembly that prevents pullout of the outer casing from the adapter and allows the inner and outer casings to freely rotate relative to the adapter.

* * * * *